(12) United States Patent
Gottfriedsen et al.

(10) Patent No.: US 12,366,478 B2
(45) Date of Patent: Jul. 22, 2025

(54) FORCE TRANSMISSION ELEMENT FOR A BALANCE OR LOAD CELL

(71) Applicant: Wipotec GmbH, Kaiserslautern (DE)

(72) Inventors: Jan Gottfriedsen, Waldfischbach-Burgalben (DE); Jan-David Klingelhöfer, Kaiserslautern (DE)

(73) Assignee: Wipotec GmbH, Kaiserslautern (DE)

( * ) Notice: Subject to any disclaimer, the term of this patent is extended or adjusted under 35 U.S.C. 154(b) by 635 days.

(21) Appl. No.: 17/524,725

(22) Filed: Nov. 11, 2021

(65) Prior Publication Data

US 2022/0155135 A1    May 19, 2022

(30) Foreign Application Priority Data

Nov. 13, 2020 (DE) .......... 102020130068.9

(51) Int. Cl.
| | |
|---|---|
| G01G 23/00 | (2006.01) |
| B33Y 80/00 | (2015.01) |
| G01G 3/14 | (2006.01) |
| G01G 21/23 | (2006.01) |
| G01G 21/28 | (2006.01) |

(52) U.S. Cl.
CPC ......... *G01G 23/005* (2013.01); *G01G 3/1412* (2013.01); *G01G 21/23* (2013.01); *G01G 21/28* (2013.01); *G01G 23/002* (2013.01); *B33Y 80/00* (2014.12)

(58) Field of Classification Search
CPC .. G01G 23/005; G01G 3/1412; G01G 23/002; G01G 21/23; G01G 21/28; B33Y 80/00

USPC .................................................. 177/253, 262
See application file for complete search history.

(56) References Cited

U.S. PATENT DOCUMENTS

| | | | | | |
|---|---|---|---|---|---|
| 186,149 | A | * | 1/1877 | Montgomery | ......... G01G 21/22 177/262 |
| 4,711,314 | A | * | 12/1987 | Suzuki | ................. G01G 3/1412 177/164 |
| 4,753,307 | A | * | 6/1988 | Muehlenbein | ......... G01G 19/44 248/676 |

(Continued)

FOREIGN PATENT DOCUMENTS

| CN | 101163949 A | 4/2008 |
|---|---|---|
| CN | 103122520 A | 5/2013 |

(Continued)

OTHER PUBLICATIONS

Chinese Patent Office action issued Sep. 28, 2023 in CN 202080022350.1.

(Continued)

*Primary Examiner* — Randy W Gibson
(74) *Attorney, Agent, or Firm* — Calvert Technology Law, PLLC; Nathan H. Calvert

(57) ABSTRACT

A force transmission element for a balance or load cell is adapted to be arranged between a load receiving unit, receiving the load to be weighed, and a load application point of a load cell, in order to transmit the load force exerted by the load. The force transmission element is designed at least partly as a framework composed of hollow rods, in particular round rods, wherein the force transmission element, in particular the hollow rods, is/are produced at least partly using 3D printing technology.

20 Claims, 5 Drawing Sheets

(56) References Cited

U.S. PATENT DOCUMENTS

| | | | |
|---|---|---|---|
| 4,850,443 A | 7/1989 | Bergholt | |
| 4,966,241 A * | 10/1990 | Luchinger | G01G 21/22 |
| | | | 211/74 |
| 6,958,453 B2 | 10/2005 | Burkhard | |
| 7,475,595 B1 * | 1/2009 | Tesch | G01G 23/3728 |
| | | | 73/437 |
| 2002/0152715 A1 * | 10/2002 | Rotheroe | E04C 3/32 |
| | | | 52/855 |
| 2005/0045388 A1 | 3/2005 | Burkhard | |
| 2010/0181120 A1 | 7/2010 | Lo | |
| 2019/0022929 A1 | 1/2019 | Chaffins | |
| 2020/0408590 A1 * | 12/2020 | Gottfriedsen | G01G 21/24 |

FOREIGN PATENT DOCUMENTS

| | | |
|---|---|---|
| CN | 103154680 A | 6/2013 |
| CN | 104179533 A | 9/2014 |
| CN | 203824633 U | 9/2014 |
| CN | 204346571 U | 5/2015 |
| CN | 105675107 A | 6/2016 |
| CN | 107621301 A | 1/2018 |
| CN | 108496055 A | 9/2018 |
| CN | 110312964 A | 10/2019 |
| CN | 209559322 U | 10/2019 |
| DE | 202019106652 U1 | 1/2020 |
| JP | H0288138 U | 7/1990 |
| JP | H02088138 U | 7/1990 |
| JP | H05008441 U | 2/1993 |
| JP | 2007333606 A | 12/2007 |

OTHER PUBLICATIONS

EP 21208022.0 extended European search report issued on Apr. 7, 2022.
Japanese Patent Office Action issued Jul. 15, 2022, in Japanese Patent Application JP20210183420.
Japanese Patent Office action issued Nov. 8, 2022, in Japanese Patent Application JP20210183420.
Chinese Patent Office action issued Apr. 25, 2024 in CN 202111346500.7.
EP 21206022.0 Office action issued Sep. 13, 2024.

* cited by examiner

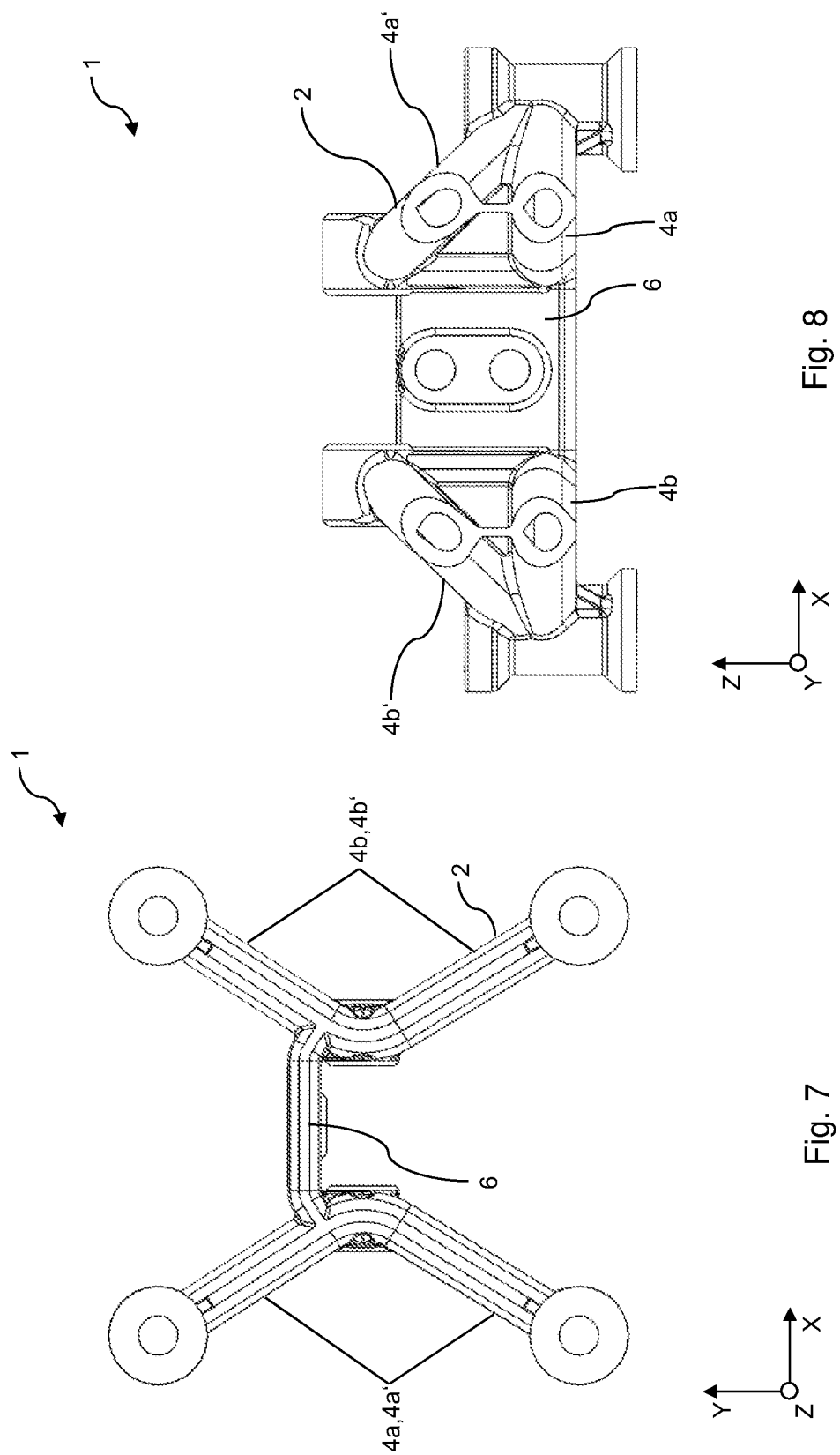

FORCE TRANSMISSION ELEMENT FOR A BALANCE OR LOAD CELL

TECHNICAL FIELD OF THE INVENTION

The present invention relates to a force transmission element for a balance or load cell, which is arranged between a load receiving unit, receiving the load to be weighed, and a load application point of a load cell, in order to transmit the load force exerted by the load, characterized in that the force transmission element is produced at least partly as a framework composed of hollow rods which are connected to each other via nodes, whereby a load on the framework is only applied at the nodes and is only carried by tensile or compressive forces in the hollow rods, and the force transmission element is produced at least partly using 3D printing technology.

BACKGROUND OF THE INVENTION

Balances play an important role in the automated industrial production of products, e.g. of foodstuffs, pharmaceuticals, etc., because e.g. they monitor the quality control of nominal filling quantities filled into prepackages, readjust the filling means or check the completeness of the packages and containers, e.g. the presence of a patient information leaflet in boxes of tablets.

Because of the desired high production throughput, the precision weighing technology used for this is to determine weighing results that are as accurate as possible within as short a measuring time as possible.

Because of its inertia, the mass mounted on the loading point of a balance or the load measuring sensor thereof, or the load cell delays the rapid mechanical settling of the weighing mechanism on the (most stable possible) final value. This applies to mechanical load beams with strain gauges as well as to load cells which operate according to the principle of electromagnetic force compensation and e.g. use a monoblock lever mechanism and a magnet system with a carrier coil.

The load (such as e.g. load assembly/loading bolt, load plate, load transporting system (e.g. band conveyor/belt conveyor consisting of a chassis, conveyor belt, toothed belt, rollers/shafts, motor etc.)) mounted on or acting on the loading point/force transmission element of a balance or load cell (in particular according to the principle of electromagnetic force compensation (EMFC), or EMFR-electromagnetic force restoration) is to meet the following requirements (a) to (d) simultaneously:
  (a) low dead weight (because the settling time is extended by a high initial load);
  (b) high rigidity (because this results in a high mechanical natural frequency and rapid settling);
  (c) low heat conduction (because this reduces the thermal influencing of the inner measuring system, in particular of the monoblock, from outside coming via the loading point)
  (d) electrical discharge capacity (in order to discharge or earth electrostatic charges, e.g. coming from the product, and in order thus to avoid or reduce the formation of static force fields influencing the measurement).

The currently known loading points/force transmission elements are generally rather bulky and heavy since the desired rigidity is usually achieved through the use of solid components. The desired low heat conductivity is e.g. brought about through a heat-insulating intermediate body made of plastic. Various screw connections are necessary here, with small parts that can be lost and a high assembly effort.

In the case of force transmission elements for a balance or load cell of the state of the art, a combination of metal and plastic is often used as materials. However, since plastic has an elastic modulus of less than 10,000 N/mm$^2$, the rigidity of the force transmission element suffers as a result, which results in a low mechanical natural frequency and slow settling. A rapid and at the same time precise measurement is therefore made difficult.

To increase the rigidity, steel could be used in place of plastic, for example. However, steel is disadvantageous due to its high dead weight and its high heat conductivity. Alternatively, stainless steel could be used, the heat conductivity of which is only approx. ⅕ that of steel. However, stainless steel is brittle and more difficult to machine by cutting processes.

SUMMARY OF THE INVENTION

The problem addressed by the invention is that of providing a force transmission element which meets all of the previously mentioned requirements (a) to (d) and can be produced easily and cost-effectively.

In devices according to the present invention, a transmission element with particularly low weight according to the principle of additive manufacturing, also known as 3D printing technology. According to some aspects of the invention, thin material layers are placed one on top of the other in succession and joined to each other, in order thus to form a spatial body incrementally, i.e. the force transmission element with its components is built up layer by layer by adding material.

The utilization of 3D printing technology in the specific application for force transmission elements provides several significant advantages:
  Known force transmission elements are generally made up of a combination of plastic and metal components, and are therefore generally heavier than necessary. Moreover, thicker areas of material heat up more slowly or cool down more slowly than thinner areas of material when the ambient temperature changes, with the result that time passes unnecessarily until steady operating conditions are reached. A force transmission element produced according to some aspects of the invention preferably has material only where it is functionally necessary, with the result that the overall weight is reduced to a minimum. The formation of the individual components of the force transmission element according to some aspects of the invention as a framework composed of hollow rods (which are connected to each other via nodes, whereby a load on the framework is only applied at the nodes and is only carried by tensile or compressive forces in the hollow rods) with material cross sections that are as small as possible also reduces the sensitivity in the case of temperature changes.
  Until now it has been necessary to assemble a force transmission element from many different individual components. This complex production is greatly simplified according to some aspects of the invention.
  Due to the high manufacturing precision, the force transmission element according to the invention can be formed in a very space-saving manner by means of 3D printing technology, with the result that the interspaces turn out to be larger and further components of a balance can be accommodated there.

The force transmission element according to some aspects of the invention for a balance or load cell is formed to be arranged between a load receiving unit, receiving the load to be weighed, and a load application point of a load cell, in order to transmit the load force exerted by the load. The force transmission element according to some aspects of the invention is characterized in that it is designed at least partly as a framework composed of hollow rods (which are connected to each other via nodes, whereby a load on the framework is only applied at the nodes and is only carried by tensile or compressive forces in the hollow rods), in particular hollow round rods, wherein the force transmission element, in particular the hollow rods, is/are produced at least partly using 3D printing technology.

The use of a framework composed of hollow rods (which are connected to each other via nodes, whereby a load on the framework is only applied at the nodes and is only carried by tensile or compressive forces in the hollow rods) results in a light and yet stable force transmission element. Furthermore, the material cross section and thus the heat conductivity remain low. In addition, the hollow rods, in particular hollow round rods, provide little surface/air resistance/contact surface for disruptive airflow/draft, as a result of which the use in pharmaceutical production affected by laminar flow is also possible. The rising warm air generated by the electronics and the carrier coil in the interior of the load cell can thereby influence the measurement reading less. In some aspect of the invention, the use of a framework composed of hollow rods (which are connected to each other via nodes, whereby a load on the framework is only applied at the nodes and is only carried by tensile or compressive forces in the hollow rods) both inside and outside the load cell/balance housing therefore has advantages. Furthermore, particularly little dirt accumulates on round rods, and they can be cleaned particularly well. The use of a framework composed of hollow rods (which are connected to each other via nodes, whereby a load on the framework is only applied at the nodes and is only carried by tensile or compressive forces in the hollow rods) makes a space-saving, filigree design of the force transmission element according to some aspects of the invention possible. A free inner area remains, which can be used for the arrangement of other components or assemblies.

For example, the load cell can be a force sensor with a purely mechanical bending beam arrangement, which uses a strain gauge (DMS) as force sensor for example, or a force sensor which operates according to the principle of electromagnetic force compensation (EMFC). However, other types of force sensors which are known in the state of the art are also conceivable for the load cell. The force transmission element according to some aspects of the invention is particularly preferably used in a load cell which operates according to the principle of EMFC.

The load receiving unit can be a load plate, load pan or load transporting unit. The load application point is a point of the load cell at which a load is applied. The Load receiving unit and load application point are preferably coupled to the force transmission element. The force transmission element is preferably arranged as a module between load receiving unit and load application point. The load receiving unit can receive the load to be measured from a load transporting unit, for example. A load transporting unit can be a conveyor belt or a starwheel, for example.

The force transmission element according to some aspects of the invention extends in a longitudinal direction X, a transverse direction Y orthogonal thereto and a vertical direction Z again orthogonal to these two directions.

In one aspect of the invention, the force transmission element is preferably produced entirely using 3D printing technology. The force transmission element can thereby be designed particularly light and yet stable.

In a further aspect, stainless steel can be at least partly used as material for the force transmission element according to the invention, in particular for the part of the force transmission element produced by 3D printing technology. Compared with steel, stainless steel has the advantage that it has a much lower heat conductivity. Furthermore, when 3D printing technology is used, the disadvantages which arise due to the brittle material behavior of stainless steel when machining processes are used do not play such an important role.

In various aspects, the force transmission element can be arranged inside or outside the housing of a balance or of a load cell, or the force transmission element can pierce the housing, i.e. pass through the wall. In other words, the present invention also relates to a balance or load cell in which the force transmission element is arranged inside or outside the housing of the balance or of the load cell, or in which the force transmission element pierces the housing. The arrangement inside the housing is preferred.

In a further aspects of the invention, it is preferred for the force transmission element to include an overload protection for the load cell (as an integral component part or protruding into free spaces), and/or for the force transmission element to be formed to be coupled indirectly or directly to an overload protection. The overload protection is preferably formed deflectable in order to dissipate forces in the case of an overload before components of the load cell or of the balance are damaged.

In a further aspect, the force transmission element according to the invention can have at least three, preferably four, end regions. The end regions are preferably formed to be coupled indirectly or directly to the load receiving unit and/or the load application point and/or the overload protection. The end regions are most preferably formed to be coupled directly to the overload protection.

In a further design of the force transmission element according to some aspects of the invention it is preferred for the force transmission element to have at least one V structure. By a V structure is preferably meant according to the invention a structure in which two hollow rods are joined to each other such that together they imitate a "V". Herein, the two hollow rods are called "branches of the V structure". The point at which the two branches of the V structure are joined to each other is referred to herein as "peaked side" of the V structure. "Ends of the branches of the V structure" are located on the opposite side. The use of a V structure has the advantage of a relatively high mechanical stability since it can divert and focus the acting forces.

In a further design the force transmission element according to some aspects of the invention can have at least two V structures. The at least two V structures are preferably joined to each other, indirectly or directly, via the peaked sides of the V structures, preferably via a common base element. The at least two V structures can be joined to each other directly. Here there are two possibilities, either they are joined to each other directly at the ends of the peaked sides, as a result of which the structure of an "X" results in top view, or the at least two V structures are pushed into each other in the direction of their peaked sides such that they have two junctions in each case via the branches of the V structures. Furthermore, the at least two V structures can also be joined to each other indirectly. In this case they are preferably joined to each other via a common base element. The use of a base element has the advantage that for example attachment possibilities or coupling points for further balance components, such as for the loading bolt or the loading bar of the load cell, can be provided therein. The use of V structures has the advantage that the force transmission element according to the invention can be designed particularly flat (in vertical direction Z).

In a further design of the force transmission element according to some aspects of the invention the ends of the branches of the V structures preferably lie in a plane which is spanned along the longitudinal direction X and the transverse direction Y, i.e. the ends of the branches form the corners of an (imaginary) rectangle, in particular square or trapezoid. A view in the Z direction (XY projection) onto the force transmission element according to the invention thus preferably shows exactly two V structures, i.e. a so-called double-V structure. The use of such a double-V structure has the advantage that off-center forces during the loading of the structure can be better absorbed, for example compared with an H structure (in the XY projection).

The above-mentioned end regions, which are formed to be mounted indirectly or directly to the load receiving unit and/or the load application point and/or the overload protection, are preferably located at the ends of the branches of the V structures.

In a further design of the force transmission element according to some aspects of the invention it is preferred for the peaked sides of the V structures likewise to lie in the plane spanned along the longitudinal direction X and the transverse direction Y. However, the peaked sides of the V structures can likewise also come out of the plane spanned along the longitudinal direction X and the transverse direction Y in the direction of the vertical direction Z. Each of the V structures visible in the XY projection particularly preferably has two V structures, which lie one above the other in the XY projection. These V structures, lying one above the other, are preferably joined to each other directly in each case via both the ends of their branches and joined to each other indirectly via their peaked sides, preferably via a bar.

According to a further design of the force transmission element according to some aspects of the invention the latter has at least one coupling point for coupling to the load application point of the load cell, wherein the coupling point is preferably arranged between the two V structures. The force transmission element preferably has at least two coupling points, wherein one of the coupling points makes an attachment in the longitudinal direction X via a first mounting means possible and a further one of the coupling points makes an attachment in the vertical direction Z via a second mounting means possible. It is preferred for the base element to have at least one of the coupling points. The base element is preferably designed at least partly as a plate and/or surface. The base element preferably has the coupling point in the form of a hole, in which the loading bolt of the load cell is mounted. The further coupling point is preferably provided on the peaked sides of the V structure(s).

In a further design the force transmission element according to some aspects of the invention preferably has a greater extent in the plane spanned along the longitudinal direction X and the transverse direction Y than an extent in the direction of the vertical direction Z. This has the advantage that the stability of the force transmission element is particularly high and as a result a particularly good force transmission between load receiving unit and load application point can take place, in particular when the load receiving unit or the overload protection is attached to the end regions and the load application point is attached in the middle of the force transmission element. The extent in the direction of the vertical direction Z is preferably at most half, more preferably at most a fifth, and most preferably at most a tenth of the extent in the plane spanned along the longitudinal direction X and the transverse direction Y.

In other aspects, the present invention also relates to a process for the production of a force transmission element using 3D printing technology. Likewise, the present invention also relates to the use of a force transmission element according to some aspects of the invention, which is produced by 3D printing technology, in a balance, in particular as a modular joining element lying in between, solely in terms of force, a load receiving unit, receiving the load to be weighed, and a load application point of a load cell.

In the process/use according to some aspects of the invention the individual components of the force transmission element according to the invention are formed by repeatedly depositing thin material layers on each other (3D printing technology). The production of one component is preferably effected "simultaneously" with the production of other components, wherein by "simultaneously" is meant that, first of all, all material regions of a particular layer or at a particular layer height are formed before the next-higher layer is applied. The material buildup of one component is thus interrupted by the material buildup of at least one further component, if both components require material buildup at the same layer height. However, it is theoretically also possible first of all to form one component partly or completely, in order then to create a further component.

BRIEF DESCRIPTION OF THE DRAWINGS

FIG. 7 shows the force transmission element of FIG. 1, viewed in the Z direction (XY projection) cut along the XY projection plane.

FIG. 8 shows the force transmission element of FIG. 1, viewed in the Y direction (XZ projection) cut along the XZ projection plane.

DESCRIPTION OF REPRESENTATIVE EMBODIMENTS

Figures 1, 2:
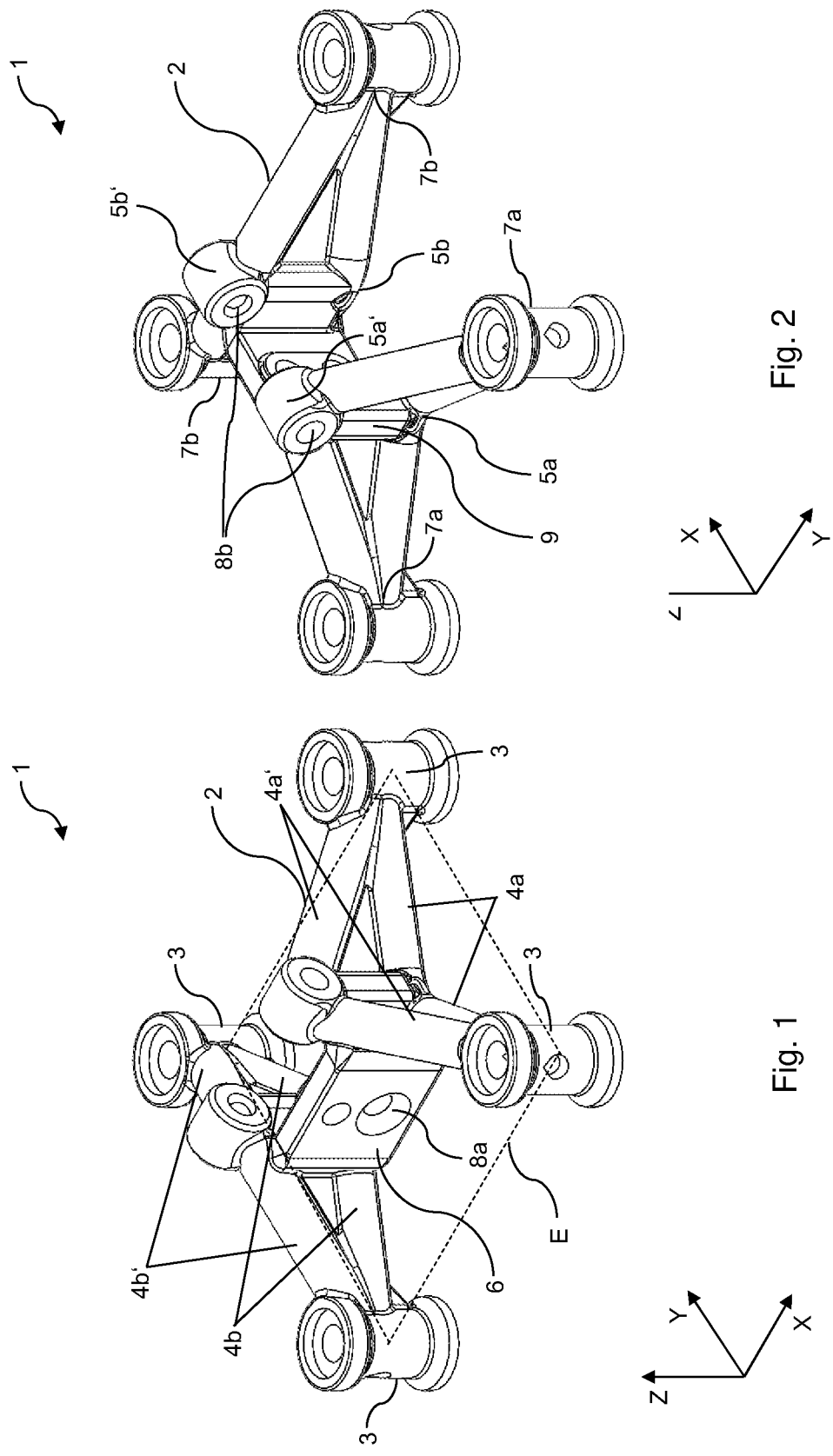
FIG. 1 shows a force transmission element according to an example embodiment of the invention in oblique view.
FIG. 2 shows the force transmission element of FIG. 1, which is rotated by 90° compared with FIG. 1, in oblique view.

FIGS. 1 and 2 each show a force transmission element 1 according to an example embodiment of the invention in oblique view. The force transmission element 1 is substantially constructed by a framework 2 composed of hollow rods (which are connected to each other via nodes, whereby a load on the framework is only applied at the nodes and is only carried by tensile or compressive forces in the hollow rods), which are preferably hollow round rods. The force transmission element 1 preferably has two first V structures 4a, 4a' and two further V structures 4b, 4b', wherein the first V structures 4a, 4a' and the further V structures 4b, 4b' are joined to each other via a base element 6. In principle it is also possible according to some embodiments of the invention for one of the first V structures 4a, 4a' and one of the further V structures 4b, 4b' to be omitted, with the result that the first V structure is formed either only by the V structure 4a or by the V structure 4a', and the second V structure is formed either only by the V structure 4b or by the V structure 4b'. In the embodiment shown in FIG. 1, the V structure 4a and the V structure 4b lie in the plane which is spanned by the longitudinal direction X and the transverse direction Y, i.e. both the ends 7a of the branches of the first V structure 4a and the ends 7b of the branches of the second V structure 4b, as well as the peaked sides 5a and 5b lie in the named plane. Similarly, in the case of the V structures 4a' and 4b', the ends 7a of the branches of the first V structure 4a' and the ends 7b of the branches of the second V structure 4b' lie in the named plane, but the peaked sides 5a' and 5b' project in the Z direction out of the plane which is spanned by the longitudinal direction X and the transverse direction Y. The peaked sides 5a and 5a' are joined to each other via a bar 9, which preferably extends along the Z direction as a hollow rod. Likewise, the peaked sides 5b and 5b' are also joined to each other via a bar 9, which likewise preferably extends along the Z direction as a hollow rod. In the end regions 3, coupling points for coupling an overload protection are provided which are preferably formed along the Z direction as hollow cylinders, which preferably have regions with larger diameters (collars) both at the top and at the bottom (seen in the Z direction), in order to facilitate a better reception, support and positioning of the components engaging there later. The end regions 3 formed as hollow cylinders each have at least one drop-shaped opening at the side on the lateral surface which act as a drain for material not required for the production of the hollow regions of the hollow rods. The base element 6 is preferably formed as a plate, which extends along a plane which is spanned by the longitudinal direction X and the vertical direction Z. The base element 6 preferably has a first coupling point 8a, which makes it possible to attach a load application point in the vertical direction Z via a first mounting means. At the peaked sides 5a' and 5b', a coupling point 8b is likewise provided, which makes it possible to attach a load application point in the longitudinal direction X via a second mounting means.

Figure 3:
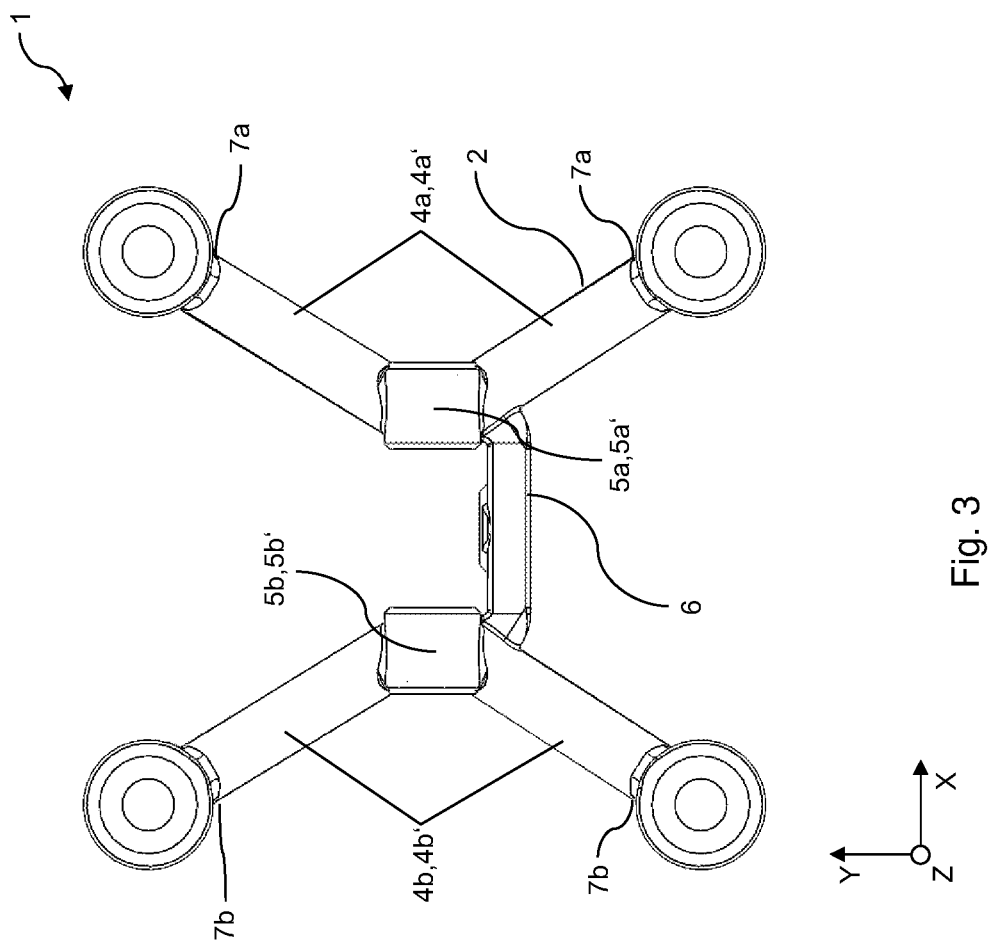
FIG. 3 shows the force transmission element of FIG. 1, viewed in the Z direction (XY projection).

FIG. 3 shows the force transmission element 1 viewed in the Z direction (XY projection). From this XY projection it can be learned that the force transmission element 1 according to the invention has a so-called double-V structure. Here, the base element 6 joins the first V structure 4a, 4a' to the further V structure 4b, 4b'. Because of the view in the Z direction, it is not possible to see here that there are two first V structures 4a, 4a' and two further V structures 4b, 4b'. However, it can clearly be seen that the peaked side 5a, 5a' and the peaked side 5b, 5b' are facing each other along the X direction. To increase the stability, the ends 7a and 7b of the branches of the first V structure 4a, 4a' and of the second V structure 4b, 4b' project further outwards in the X direction in contrast to a pure H-shaped structure.

Figure 4:
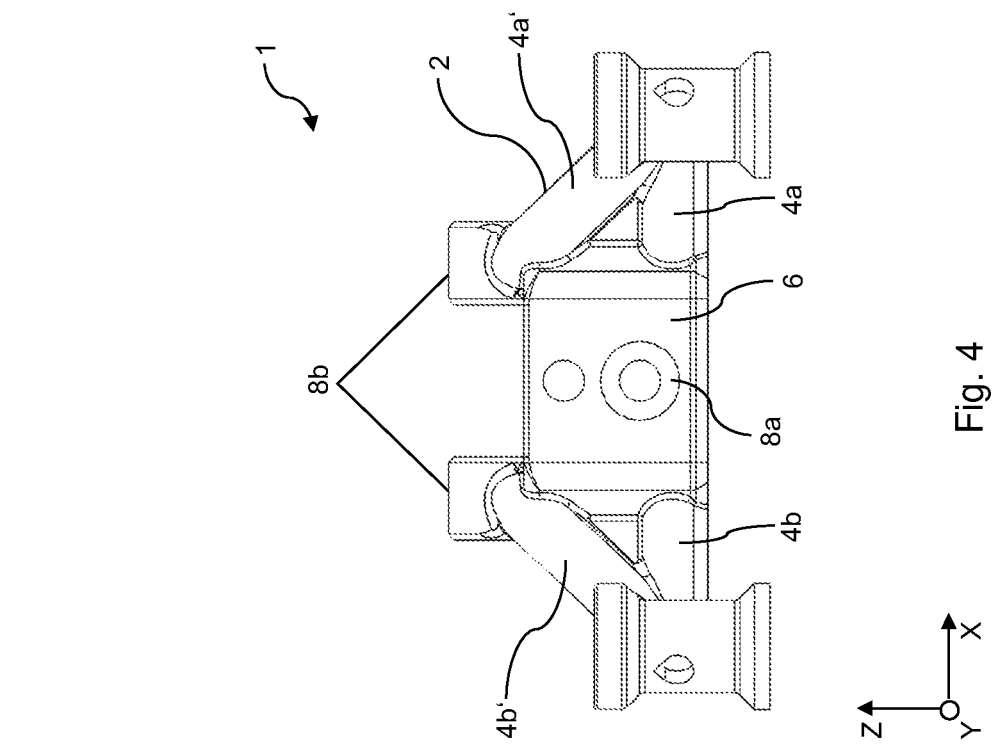
FIG. 4 shows the force transmission element of FIG. 1, viewed in the Y direction (XZ projection).

FIG. 4 shows the force transmission element 1 viewed in the Y direction (XZ projection). Here, the view is in the Y direction onto the large surface of the plate of the base element 6, which shows the first coupling point 8a as a hole (with counterbore) through the base element 6. Above the coupling element 8a, a further hole is provided through the plate of the base element 6 for the arrangement of a locating pin.

Figure 5:
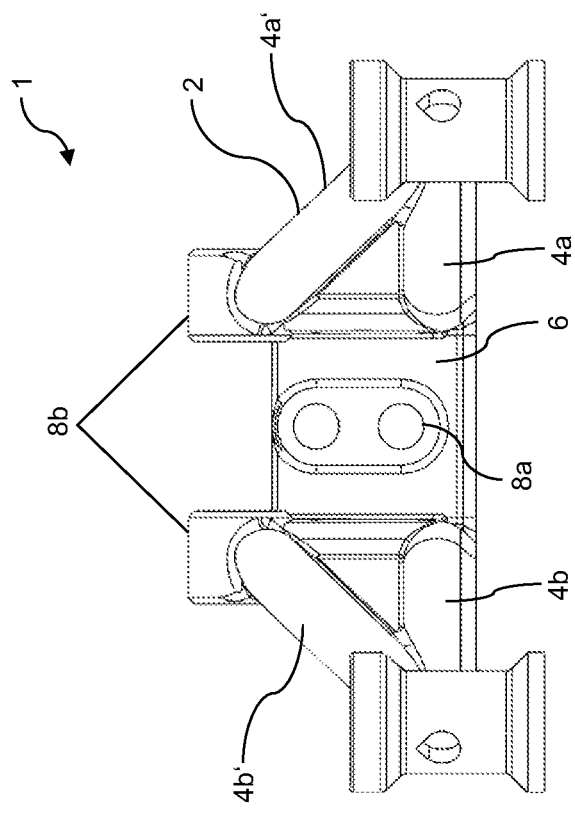
FIG. 5 shows the force transmission element of FIG. 1, viewed in the X direction (YZ projection).

FIG. 5 shows the force transmission element 1 viewed in the X direction (YZ projection). Here, it can be seen that the first V structure 4a, 4a' and the further V structure 4b, 4b', respectively, are joined to each other via the bar 9.

Figure 6:
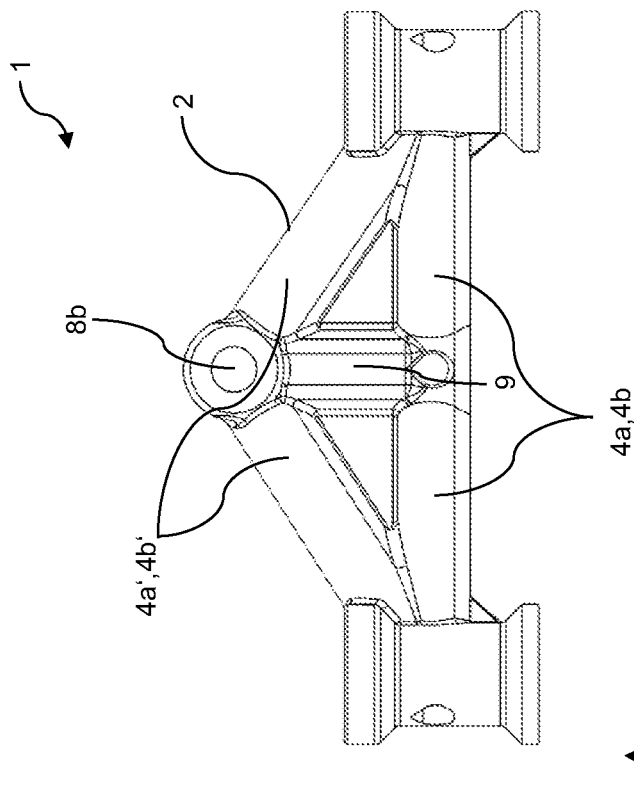
FIG. 6 shows the force transmission element of FIG. 1, viewed in the Y direction (XZ projection) from the opposite side from FIG. 4.

FIG. 6 shows the force transmission element 1 viewed in the Y direction (XZ projection) from the opposite side from FIG. 4 with the same reference numbers as in FIG. 4.

FIG. 7 shows the force transmission element 1 viewed in the Z direction (XY projection) cut along the XY projection plane. FIG. 8 shows the force transmission element viewed in the Y direction (XZ projection) cut along the XZ projection plane. In both figures it becomes clear that the branches of the first V structure 4a, 4a' and of the second V structure 4b, 4b' are formed as hollow rods, preferably hollow round rods. Likewise, it becomes apparent that the base element 6 has a cavity, which extends along the Z direction in FIG. 7.

Figure 9:
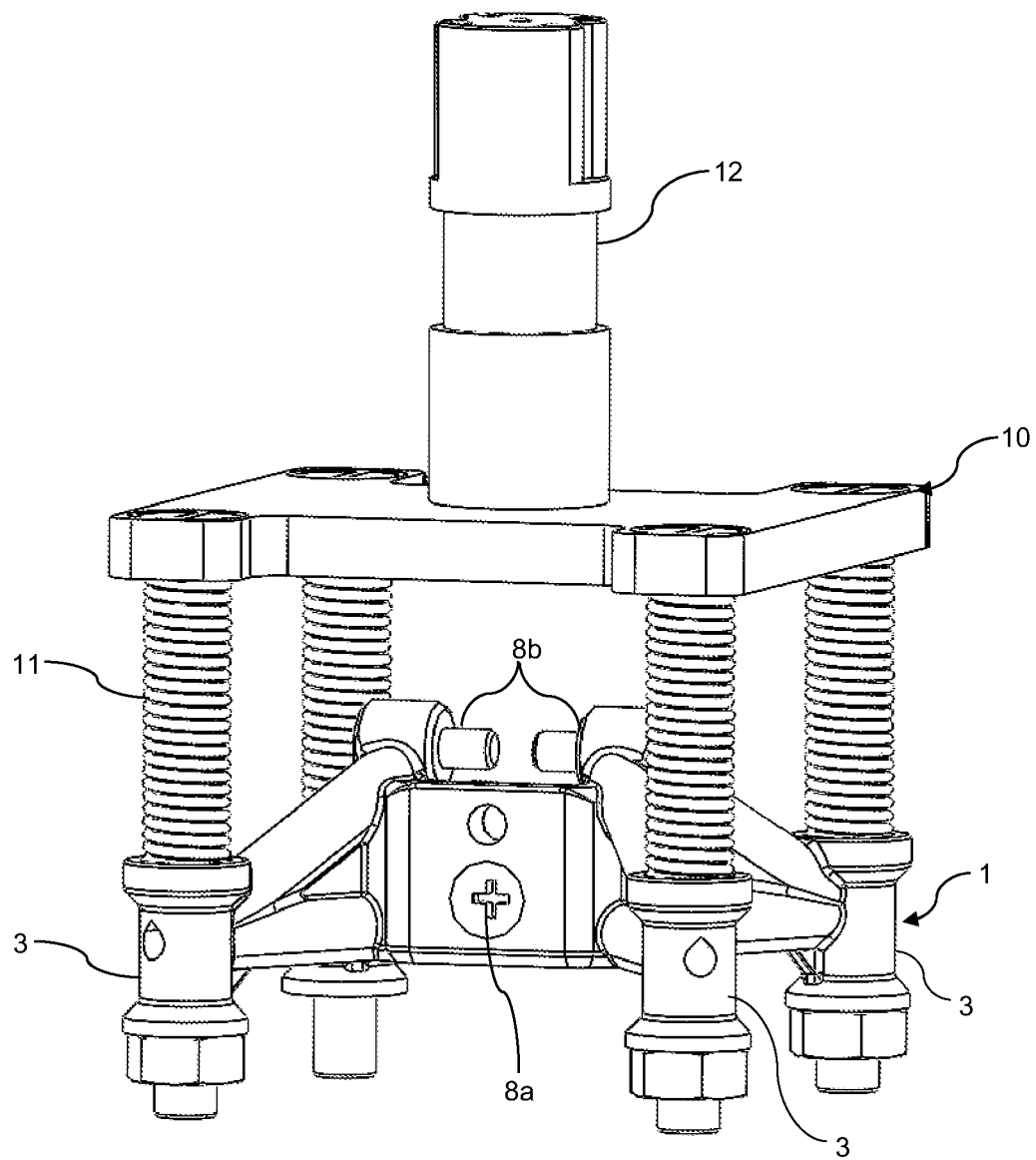
FIG. 9 shows a force transmission element according to another embodiment of the invention, to which an overload protection is coupled.

FIG. 9 shows a force transmission element 1 according to another embodiment of the invention which is coupled to an overload protection element 10. Here, the overload protection element 10 is preferably joined to the four end regions 3 of the force transmission element 1, formed as cylindrical coupling points, via screws, wherein the screws are preferably surrounded by spring elements 11 designed as compression springs, which ensure that an overload can be absorbed. Here, it can clearly be seen that, with the force transmission element 1, a combined element consisting of the force transmission element 1 and the overload protection element 10 can be provided, in which the coupling points 8a and 8b, for coupling to the load application point of a load cell, lie in the center. The overload protection element 10 has an element 12 for coupling to a load receiving unit.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE NUMBERS 1 force transmission element
2 framework composed of hollow rods which are connected to each other via nodes, whereby a load on the framework is only applied at the nodes and is only carried by tensile or compressive forces in the hollow rods 6
3 end regions
4a, 4a' first V structure
4b, 4b' further V structure
5a, 5a' peaked side of the first V structure
5b, 5b' peaked side of the further V structure
6 base element
7a ends of the branches of the first V structure
7b ends of the branches of the second V structure
8a first coupling point
8b second coupling point
9 bar
10 overload protection
11 spring elements
12 element for coupling to the load receiving unit
X longitudinal direction
Y transverse direction
Z vertical direction
E plane which is spanned by the longitudinal direction X and the transverse direction Y

The invention claimed is:

1. A force transmission element for a load cell, the force transmission element comprising:
   a framework of hollow rods whereby a load on the framework is only carried by tensile or compressive forces along the hollow rods in the direction of their extension, the framework of hollow rods including at least two hollow rods connected together via a first junction, the framework of hollow rods adapted to be coupled in an operating position between a load application point of the load cell and a load receiving unit that receives the load to be weighed so that a load force exerted by the load received on the load receiving unit is transmitted to the load application point through the framework of hollow rods including the at least two hollow rods; and
   wherein at least the hollow rods are produced at least partly using 3D printing.

2. The force transmission element of claim 1 wherein the hollow rods are round.

3. The force transmission element of claim 1 wherein at least some portions of the force transmission element produced using 3D printing are formed from stainless steel.

4. The force transmission element of claim 1 further comprising an overload protection element for the load cell.

5. The force transmission element of claim 1 wherein the force transmission element is adapted to be coupled indirectly or directly to an overload protection element for the load cell.

6. The force transmission element of claim 1 wherein the force transmission element includes at least three end regions, which are formed to be coupled indirectly or directly to the load receiving unit.

7. The force transmission element of claim 6 wherein the at least three end regions are formed to be coupled to the load application point.

8. The force transmissions element of claim 6 wherein the at least three end regions are formed to be coupled to an overload protection element between the force transmission element and the load application point.

9. The force transmission element of claim 1 wherein the framework of hollow rods includes a first V structure wherein each respective branch of the first V structure includes one of the at least two hollow rods and the first junction forms the peaked side of the first V structure.

10. The force transmission element of claim 9 wherein the framework of hollow rods further includes a second V structure including two hollow rods connected together via a second junction wherein each respective branch of the second V structure includes one of the two hollow rods included in the second V structure and the second junction forms the peaked side of the second V structure and wherein the first V structure is arranged relative to the second V structure such that the peaked side of the first V structure faces the peaked side of the second V structure and is coupled, directly or indirectly, to the peaked side of the second V structure.

11. The force transmission element of claim 10 wherein when coupled in the operating position the framework of hollow rods extends in an direction X, a direction Y orthogonal to the direction X, and a height direction Z orthogonal to both the direction X and the direction Y and wherein the first V structure and the second V structure are coupled to each other via a base element.

12. The force transmission element of claim 11 wherein each respective branch of the first V structure and the second V structure includes a respective branch end that lies in a plane E which extends in the direction X and the direction Y.

13. The force transmission element of claim 12 wherein the peaked side of the first V structure and the peaked side of the second V structure lie in the plane E.

14. The force transmission element of claim 12 wherein the peaked side of the first V structure and the peaked side of the second V structure each includes a respective elongated bar, each respective elongated bar extending in the height direction Z out of the plane E, and wherein each respective branch of the first V structure and the second V structure includes a respective pair of hollow rods diverging from the respective branch end to the elongated bar of the respective V structure.

15. The force transmission element of claim 11 further including a first coupling point for coupling to the load application point of the load cell, wherein the first coupling point is located between the first V structure and the second V structure.

16. The force transmission element of claim 15 further including a second coupling point located between the first V structure and the second V structure, wherein the first coupling point is adapted to make an attachment in the height direction Z via a first mounting means, and the second coupling point is adapted to make an attachment in the direction X via a second mounting means.

17. The force transmission element of claim 15 wherein the base element includes a second coupling point for coupling to the load cell.

18. The force transmission element of claim 17 wherein the base element is constructed at least partly as a plate.

19. The force transmission element of claim 17 wherein the force transmission element in plane E has a greater extent than in the height direction Z, in particular the extent in the height direction Z is at most half of the extent in the plane E.

20. The force transmission element of claim 19 wherein the extent of the force transmission element in the height direction Z is at most a fifth of the extent in the plane E.

* * * * *